UNITED STATES PATENT OFFICE.

THOMAS S. ROBINSON, OF BELVIDERE, NEW YORK.

IMPROVEMENT IN LIQUID LAUNDRY-BLUING.

Specification forming part of Letters Patent No. 181,282, dated August 22, 1876; application filed July 3, 1876.

*To all whom it may concern:*

Be it known that I, THOMAS S. ROBINSON, of Belvidere, in the county of Allegany and State of New York, have invented a new and valuable Improvement in Liquid Laundry-Bluing; and I do hereby declare that the following is a full, clear, and exact description of the same.

This invention has relation to liquid bluing for laundry purposes; and it consists in adding to the mixture a suitable quantity of glycerine, whereby said bluing is much improved in strength, it being more concentrated, also the addition of glycerine preventing it from freezing in cold climates, the result of which would tend to break the bottle, and thereby damage the goods in contact with the escaping liquid.

In the manufacture of my improved solution I do not desire to be understood as limiting myself to any specified quantity of glycerine; neither do I wish to be confined to any particular formula of proportions, or in the mode of mixing laundry-bluing, as there are various compounds now in use which contain different ingredients, in different proportions, to which the introduction of glycerine will act with equal effect, and any quantity or proportion of glycerine will aid in preventing the effects of frost, and from one-third to one half will entirely prevent the bluing freezing in any climate.

Having now fully described the nature and purpose of my invention, what I claim as new, and desire to secure by Letters Patent, is—

The composition of matter consisting of liquid laundry-bluing and glycerine, for the purpose specified.

In testimony that I claim the above I have hereunto subscribed my name in the presence of two witnesses.

THOMAS S. ROBINSON.

Witnesses:
J. E. ROBINSON,
A. C. JACKSON, Jr.